United States Patent
Rota

(10) Patent No.: US 10,776,295 B2
(45) Date of Patent: Sep. 15, 2020

(54) VEHICLE SAFETY ELECTRONIC CONTROL SYSTEM

(71) Applicant: VEONEER SWEDEN AB, Vargarda (SE)

(72) Inventor: Alina Rota, Caransebes (RO)

(73) Assignee: VEONEER SWEDEN AB, Vargarda (SE)

( * ) Notice: Subject to any disclaimer, the term of this patent is extended or adjusted under 35 U.S.C. 154(b) by 0 days.

(21) Appl. No.: 15/767,564

(22) PCT Filed: Oct. 12, 2016

(86) PCT No.: PCT/EP2016/074441
§ 371 (c)(1),
(2) Date: Apr. 11, 2018

(87) PCT Pub. No.: WO2017/064111
PCT Pub. Date: Apr. 20, 2017

(65) Prior Publication Data
US 2018/0307635 A1    Oct. 25, 2018

(30) Foreign Application Priority Data
Oct. 13, 2015  (EP) ..................................... 15189503

(51) Int. Cl.
*G06F 13/20* (2006.01)
*H04L 12/403* (2006.01)
(Continued)

(52) U.S. Cl.
CPC ............ *G06F 13/20* (2013.01); *G06F 9/4881* (2013.01); *G06F 9/52* (2013.01); *H04L 12/40* (2013.01);
(Continued)

(58) Field of Classification Search
None
See application file for complete search history.

(56) References Cited

U.S. PATENT DOCUMENTS 7,743,273 B2  6/2010  Ohno
8,775,681 B2  7/2014  Menon et al.
(Continued)

FOREIGN PATENT DOCUMENTS

| DE | 10 2012 223 308 A1 | 6/2014 |
| JP | 2008-293367 A | 12/2008 |
| KR | 101 542 016 B1 | 8/2015 |

OTHER PUBLICATIONS

International Search Report and Written Opinion of PCT/EP2016/074441, dated Dec. 8, 2016.

*Primary Examiner* — Henry Tsai
*Assistant Examiner* — Aurangzeb Hassan
(74) *Attorney, Agent, or Firm* — Dickinson Wright PLLC

(57) ABSTRACT

A vehicle safety electronic control system (11) including master and slave microcontrollers (12, 13). The master microcontroller (12) is connected to a TDMA network bus, and the slave microcontroller (13) is connected to the master microcontroller (12) via a general purpose input/connection (14). Both microcontrollers (12, 13) are configured to operate schedule table based execution, and each has a respective synchronization counter. The master microcontroller (12) is configured to update its synchronization counter in response to a primary synchronization signal (19) from the network bus (10), and to issue a corresponding secondary synchronisation signal (20) to the slave microcontroller (13) via the general purpose input/output connection (14). The slave microcontroller (13) is configured to update its synchronization counter in response to the secondary synchronization signal (20) from the master microcontroller (12) such that
(Continued)

the schedule tables of both microcontrollers (12, 13) are synchronized to the network bus (10).

9 Claims, 3 Drawing Sheets

(51) Int. Cl.
     *G06F 9/48*          (2006.01)
     *G06F 9/52*          (2006.01)
     *H04L 12/40*        (2006.01)

(52) U.S. Cl.
     CPC .. *H04L 12/403* (2013.01); *H04L 2012/40241* (2013.01)

(56) References Cited

U.S. PATENT DOCUMENTS

| | | | |
|---|---|---|---|
| 9,706,018 | B2 | 7/2017 | Jeon et al. |
| 2008/0294925 | A1 | 11/2008 | Ohno |
| 2009/0044041 | A1* | 2/2009 | Armbruster ....... H04L 12/40189 714/3 |
| 2010/0001770 | A1 | 1/2010 | Piro |
| 2012/0278501 | A1 | 11/2012 | Bansal et al. |
| 2012/0278507 | A1 | 11/2012 | Menon et al. |
| 2014/0133350 | A1* | 5/2014 | Triess ................. H04L 41/0893 370/254 |
| 2016/0046265 | A1* | 2/2016 | Heise ..................... G06F 9/544 701/70 |
| 2016/0196176 | A1* | 7/2016 | Thompson .......... G06F 11/0739 714/57 |

\* cited by examiner

VEHICLE SAFETY ELECTRONIC CONTROL SYSTEM

CROSS-REFERENCE TO RELATED APPLICATIONS

This application is a 35 U.S.C. § 371 national phase application of PCT International Application No. PCT/EP2016/074441, filed Oct. 12, 2016, which claims the benefit of priority under 35 U.S.C. § 119 to European Patent Application No. 15189503.4, filed Oct. 13, 2015, the contents of which are incorporated herein by reference in their entirety.

FIELD OF THE INVENTION

The present invention relates to an electronic control system, and more particularly relates to a vehicle safety electronic control system.

BACKGROUND

Electronic safety systems for crash avoidance are now very widely used in motor vehicles. Such safety systems may include, for example: blind spot monitoring systems; active cruise control systems; pre-safe braking systems; collision avoidance systems; lane departure prevention systems; and rear-collision mitigation systems.

The complex nature of modern vehicular safety systems places great importance on the performance and reliability of the electronic control systems which are required to provide and manage the safety systems. Such control systems typically include integrated hardware and software in order to host and run so-called Advanced Driver Assistance Systems (ADAS) algorithms.

Such systems are required to satisfy very stringent safety requirements such as the ISO 26262 Functional Safety for Road Vehicles standard, which defines a so-called Automotive Safety Integrity Level (ASIL) risk classification scheme. ASIL-D represents the highest integrity requirements under this standard, and is applicable to safety-related processing tasks.

A requirement of the functional safety standard is that the control system must be capable of identifying safety-relevant errors in its arithmetic, logical and memory units, which is only possible for an ASIL-D electronic control unit if a lockstep processor architecture is used. However, processors with a lockstep architecture of this type have a relatively low processing power which is insufficient to handle modern applications like ADAS with a set of suitable sensors such as Radar, Lidar and/or cameras. It has therefore been proposed to use electronic control units (ECUs) having at least two microcontrollers, such that a first so-called "safety" microcontroller can handle important safety-related tasks and monitor the operation of a second so-called "performance" microcontroller which has a higher processing power and is thus configured to handle the main processing tasks of the system, under the supervision of the safety microcontroller. In these types of arrangements, the safety microcontroller is thus usually configured to operate as a so-called "master" microcontroller, and the performance microcontroller is usually configured to operate as a so-called "slave" microcontroller.

As will be appreciated, a typical modern ADAS system will be configured to perform various different functions (e.g. blind spot monitoring; active cruise control; pre-safe braking; collision avoidance; lane departure prevention etc.), and so the system architecture will usually include a plurality of multi-core microcontrollers. The ADAS system will furthermore include a number of communication buses to interconnect the various components, including a plurality of sensors and the microcontrollers, of the system. These communication buses may include a FlexRay serial bus, a Controller Area Network ("CAN") bus, and an Ethernet bus.

ADAS systems are generally configured to operate according to the Time Division Multiple Access ("TDMA") protocol for channel access, whereby the nodes of the system network are allocated respective time slots in which they will have exclusive access to the relevant communication bus. It is thus essential that the execution of tasks within the various nodes of the system is synchronized to the respective bus (e.g. the FlexRay bus). The system network thus has one or more synchronization nodes, which transmit synchronization signals on the bus. On reception of each synchronization signal, each other node on the network compares its own clock to that of the synchronization node clock and makes any changes required to maintain synchronization.

AUTOSAR (AUTomotive Open System ARchictecture) is an open and standardized automotive system architecture which has been jointly developed by motor vehicle manufacturers and suppliers, and its use is becoming increasingly common in modern motor vehicles as their electronics becomes more and more complex and integrated. In the context of functional safety in motor vehicles, statically scheduled tasks and alarms are required, and so the use of schedule table based processing is advantageous in such systems. AUTOSAR compliant operating systems use the schedule table processing concept.

AUTOSAR operating systems use alarms and counters with the schedule table concept. Alarms and counters allow the processing of recurring phenomena, such as timer ticks, or signals from mechanical components of the motor vehicle. When associated with a timer, they allow the management of periodic tasks. Counters are provided to count the number of "ticks" from a source. Each counter will have a maximum value, and when this value is reached the counter will return to zero. An alarm links a counter and a task. The alarm will expire when the counter reaches a predefined value, at which point a statically defined action is taken, which may be the activation of an associated task.

Schedule tables extend the concept of alarms. Like alarms, a schedule table is linked to a counter. The schedule table includes a set of expiry points, whose corresponding counter values are relative to the activation of the schedule table. When an expiry point is reached, one or more actions (e.g. task activation) are taken. The schedule table will define the activation points of all tasks in the system.

All of the microprocessors deploying AUTOSAR compliant operating systems in an automotive safety system must be synchronized to the TDMA bus, and so the schedule table on each microprocessor must be synchronized to the bus. This has not previously been possible in a reliable and simple manner in the case of multiple microcontrollers, for example within an ECU.

It is an object of the present invention to provide an improved vehicle safety electronic control system.

According to the present invention, there is provided a vehicle safety electronic control system, including: a master microcontroller and a slave microcontroller; the master microcontroller being connected to a TDMA network bus, and the slave microcontroller being connected to the master microcontroller via a general purpose input/connection; both of the microcontrollers being configured to operate schedule table based execution, and each microcontroller having a respective synchronization counter, wherein the master microcontroller is configured to update its synchronization counter in response to receipt of a primary synchronization signal from the network bus, and to issue a corresponding secondary synchronization signal to the slave microcontroller via the general purpose input/output connection, the slave microcontroller being configured to update its synchronization counter in response to receipt of the secondary synchronization signal from the master microcontroller such that the schedule tables of both microcontrollers are synchronized to the network bus.

Optionally, the control system includes a plurality of the slave microcontrollers, wherein each slave microcontroller is connected to the master microcontroller via a respective general purpose input/output connection, and the master microcontroller is configured to issue a respective the secondary synchronization signal to each slave microcontroller via its respective general purpose input/output connection.

Preferably, the master microcontroller is configured to issue the one or each the secondary synchronization signal in the form of an Interrupt Service Routine.

Advantageously, the synchronization counters of the microcontrollers have identical resolutions.

Conveniently, the one or each the slave microcontroller is not connected to the network bus directly.

Preferably, the microcontrollers are provided within a single integrated electronic control unit Advantageously, the network bus is a FlexRay bus.

Conveniently the network bus is a Controller Area Network bus.

Preferably, each the microcontroller is configured to run an AUTOSAR-compliant operating system.

Optionally, each the microcontroller includes a plurality of processing cores.

According to a second aspect of the present invention, there is provided a motor vehicle electronic safety system including a control system in accordance with the first aspect.

BRIEF DESCRIPTION OF THE DRAWINGS

So that the invention may be more readily understood, and so that further features thereof may be appreciated, embodiments of the invention will now be described by way of example with reference to the accompanying drawings in which.

DETAILED DESCRIPTION

Figure 1:
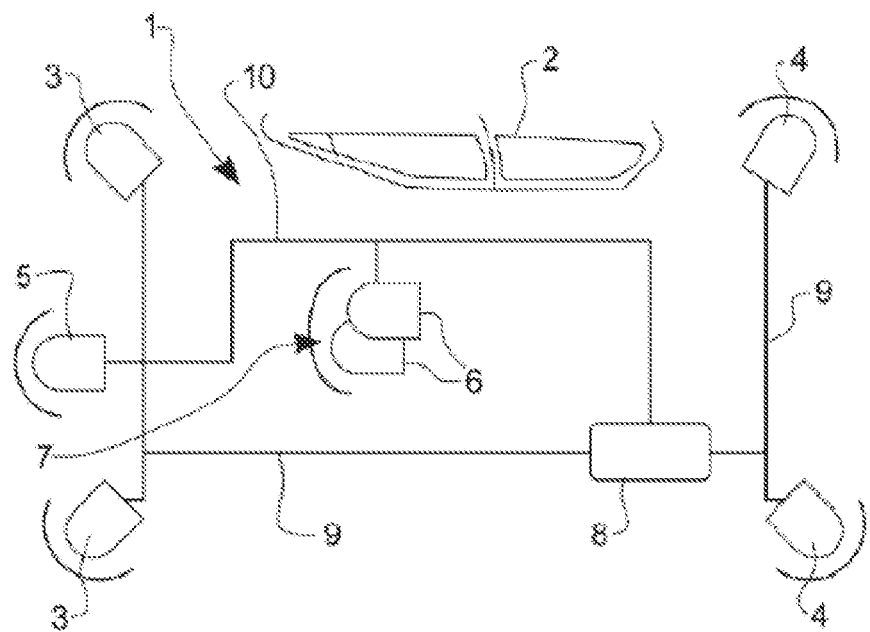
FIG. 1 is a schematic illustration showing an overview of a typical motor vehicle safety system, which may include an electronic control system in accordance with the present invention.

Turning now to consider FIG. 1 in more detail, there is illustrated a schematic representation of an exemplary electronic safety system 1 installed in a motor vehicle 2 (only one side panel of which is denoted schematically in FIG. 1 to indicate the vehicle's orientation). The safety system 1 includes a number of different types of sensor mounted at appropriate positions on the motor vehicle 2. In particular, the system 1 illustrated includes: a pair of divergent and outwardly directed mid-range radar ("MRR") sensors 3 mounted at respective front corners of the vehicle 2, a similar pair of divergent and outwardly directed multi-role radar sensors 4 mounted at respective rear corners of the vehicle, a forwardly directed long-range radar ("LRR") sensor 5 mounted centrally at the front of the vehicle 2, and a pair of generally forwardly directed optical sensors 6 forming part of a stereo vision system ("SVS") 7 which may be mounted, for example, in the region of the upper edge of the vehicle's windscreen. The various sensors 3-6 are operatively connected to a central electronic control system which may be provided in the form of an integrated electronic control unit 8 mounted at a convenient location within the vehicle. In the particular arrangement illustrated, the front and rear MRR sensors 3, 4 are connected to the central control unit 8 via a conventional Controller Area Network ("CAN") bus 9, and the LRR sensor 5 and the sensors 6 of the SVS 7 are connected to the central control unit 8 via a faster FlexRay serial bus 10, also of a type known per se. It is to be appreciated, however, that other convenient bus configurations can be used such as, for example, an Ethernet bus.

Collectively, and under the control of the control unit 8, the various sensors 3-6 can be used to provide a variety of different types of driver assistance systems such as, for example: blind spot monitoring; adaptive cruise control; collision prevention assist; lane departure protection; and rear collision mitigation. Accordingly, the control unit 8 will be configured to run appropriate software algorithms for each such driver system.

Figure 2:
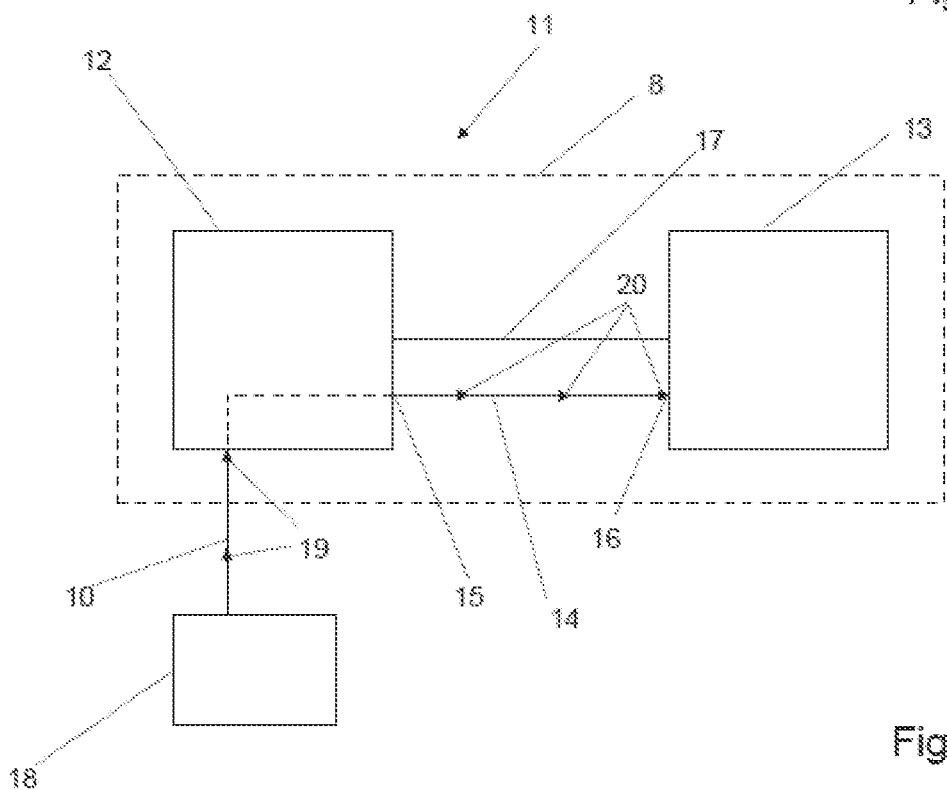
FIG. 2 is a schematic illustration showing an overview of an electronic control system in accordance with a first embodiment of the present invention, which is provided in the form of an electronic control unit.

FIG. 2 illustrates schematically the principal elements of a control system 11 in accordance with the present invention, which it will be appreciated may be provided in the form of the integrated control unit 8 (shown in phantom in FIG. 2). The control system 11 includes a first microcontroller 12, and a second microcontroller 13. The first microcontroller 12 may be configured to run safety software to satisfy the strictest (ASIL-D) safety integrity requirements of the system, which require the identification of processing errors, whilst the second microcontroller 13 may have a higher processing power and thus be configured to handle the main processing tasks of the system and some safety-related processing tasks in order to relieve the first microcontroller 12. Because the first microcontroller 12 is configured to satisfy the strict safety integrity requirements of the system it can be considered to represent a so-called "safety microcontroller", and may have a lockstep architecture. Because the second microcontroller 13 is configured to have a higher processing power than the master microcontroller 12, it can be considered to represent a so-called "performance microcontroller" and does not require a lockstep architecture. Nevertheless, it is to be appreciated that both of the microcontrollers 12, 13 may include a plurality of processing cores.

Both microcontrollers 12, 13 are configured to run an AUTOSAR-compliant operating system, and both are thus configured to operate according to the schedule table processing concept. Each microcontroller 12, 13 has a respective synchronization counter (not shown) associated with its schedule table, with both synchronization counters having an identical resolution.

The first microcontroller 12 is connected directly to a network bus for data communication, such as the FlexRay bus 10 as illustrated schematically in FIG. 2. It is to be appreciated, however, that in other embodiments the first microcontroller 12 may be connected to a Controller Area Network bus 9 instead. Whatever specific configuration of network bus may be provided, it is envisaged that the bus will be a Time Division Multiple Access (TDMA) bus.

The first and second microcontrollers 12, 13 are interconnected via a general purpose input/output connection 14 provided between a general purpose input/output (GPIO) pin 15 on the first microcontroller 12 and a corresponding GPIO pin 16 on the second microcontroller 13. As will be noted from FIG. 2, the second microcontroller 13 is connected only to the first microcontroller and is not connected to the network bus 10 directly. Nevertheless, it is envisaged that the two microcontrollers may be interconnected via an inter-processor communication path 17, in addition to the GPIO connection 14, to permit the exchange of data pertaining to operation of the various driver assistance and safety systems. As will be explained in more detail below, the GPIO connection 14 is provided solely for the purpose of permitting synchronization of the second microcontroller 13 to the network bus 10.

Also illustrated schematically in FIG. 2 is an exemplary transceiver 18 which is provided on the network bus 10, and which is configured to function as a synchronization node. The transceiver 18 is configured to transmit a periodic primary synchronization signal (denoted schematically by arrows 19 in FIG. 2) on the network bus 10. The primary synchronization signal 19 has a predetermined period (denoted $T_{sync}$) and may take the form of an Interrupt Service Routine (ISR). As will be appreciated, each pulse of the primary synchronization signal 19 will be received by the first microcontroller 12 by virtue of its direct connection to the network bus 10.

The first microcontroller 12 is configured to update its synchronization counter in response to receipt of the primary synchronization signal 19 from the network bus 10.

It is to be noted that the schedule table of each microcontroller 12, 13 will have a period (denoted $T_{sch}$) which is equal to a multiple of the period of the primary synchronization signal ($T_{sync}$). The schedule table periods are both equal, such that $T_{sch} = K \cdot T_{sync}$. The tick resolutions (denoted $T_{tick}$) of the AUTOSAR operating system of each microcontroller 11, 12 are also equal, and smaller than the period of the primary synchronization signal ($T_{sync}$). This is denoted schematically in FIG. 3 in which the top time-line (FIG. 3a) denotes the length of an application cycle, the middle time-line (FIG. 3b) denotes the pulses of the primary synchronization signal 19, and the bottom time-line (FIG. 3c) denotes the ticks of each microcontroller's operating system.

The synchronization counter of the first microcontroller 12 will thus be updated, upon receipt of the primary synchronization signal 19, in accordance with the expression:

$$Sync_{count} = Sync_{count} + (T_{sync}/T_{tick})$$

Considered another way, the synchronization counter of the first microcontroller 12 will thus be incremented by the difference in the number of operating system ticks registered between two preceding pulses of the primary synchronization signal 19:

$$Sync_{count} = Sync_{count} + (Tick\ Count[T_{sync}] - Tick\ Count[T_{sync-1}])$$

Where Tick Count [$T_{sync}$] denotes the number of operating system ticks which occurred up until receipt of the last pulse of the primary synchronization signal 19, and Tick Count [$T_{sync-1}$] denotes the number of ticks which occurred up until receipt of the previous pulse of the primary synchronization signal 19.

Because the operating system ticks are very accurate, this principle allows the system to determine the drift between the ECU's schedule and the entire vehicle network, and to make adjustments as necessary.

As well as updating its own synchronization counter in response to receipt of the primary synchronization signal 19 from the network bus 10, the first microcontroller also issues a corresponding secondary synchronization signal (denoted schematically by arrows 20 in FIG. 2) to the second microcontroller 13 via the GPIO connection 14. The secondary synchronization signal 20 may also take the form of an Interrupt Service Routine. The second microcontroller 13 is similarly configured to update its synchronization counter in response to receipt of the secondary synchronization signal 20 from the first microcontroller 12, such that the schedule tables of both microcontrollers 12, 13 are synchronized to the network bus 10.

As will therefore be appreciated, the schedule tables of both microcontrollers 12, 13 are synchronized to the network bus 10 each and every time the synchronization counter of the first microcontroller 12 is updated in response to receipt of the primary synchronization signal 19 from the bus 10.

Furthermore, it will be noted that the system is configured such that the synchronization counter of the first microcontroller 12 is updated in direct response to receipt of the primary synchronization signal 19 from the network bus, whilst the synchronization counter of the second microcontroller 13 is updated in response to the secondary synchronization signal 20 issued by the first microcontroller 12. The first microcontroller 12 thus acts as a synchronization master microcontroller, whilst the second microcontroller 13 acts as a synchronization slave microcontroller.

Figure 3:
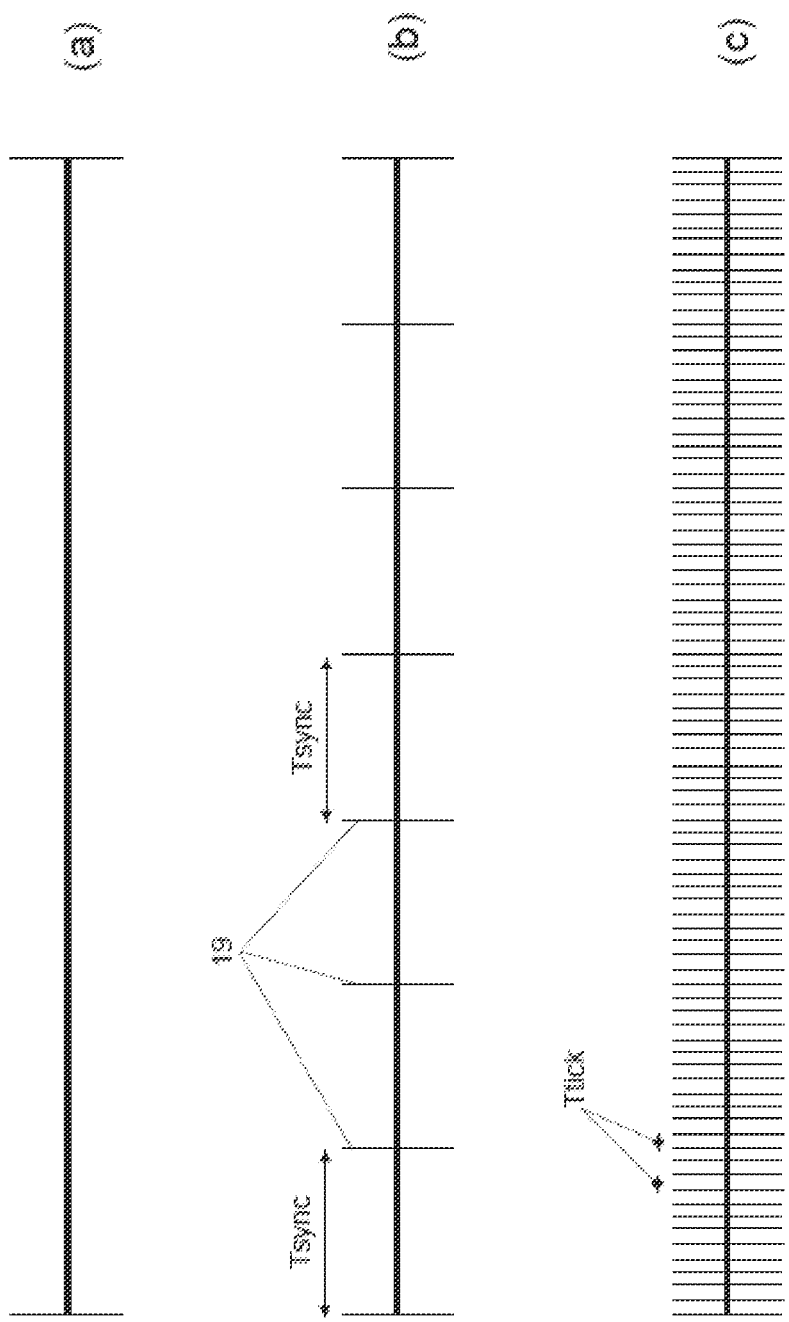
FIG. 3 is shows a series of schematic time-line plots.
Figure 4:
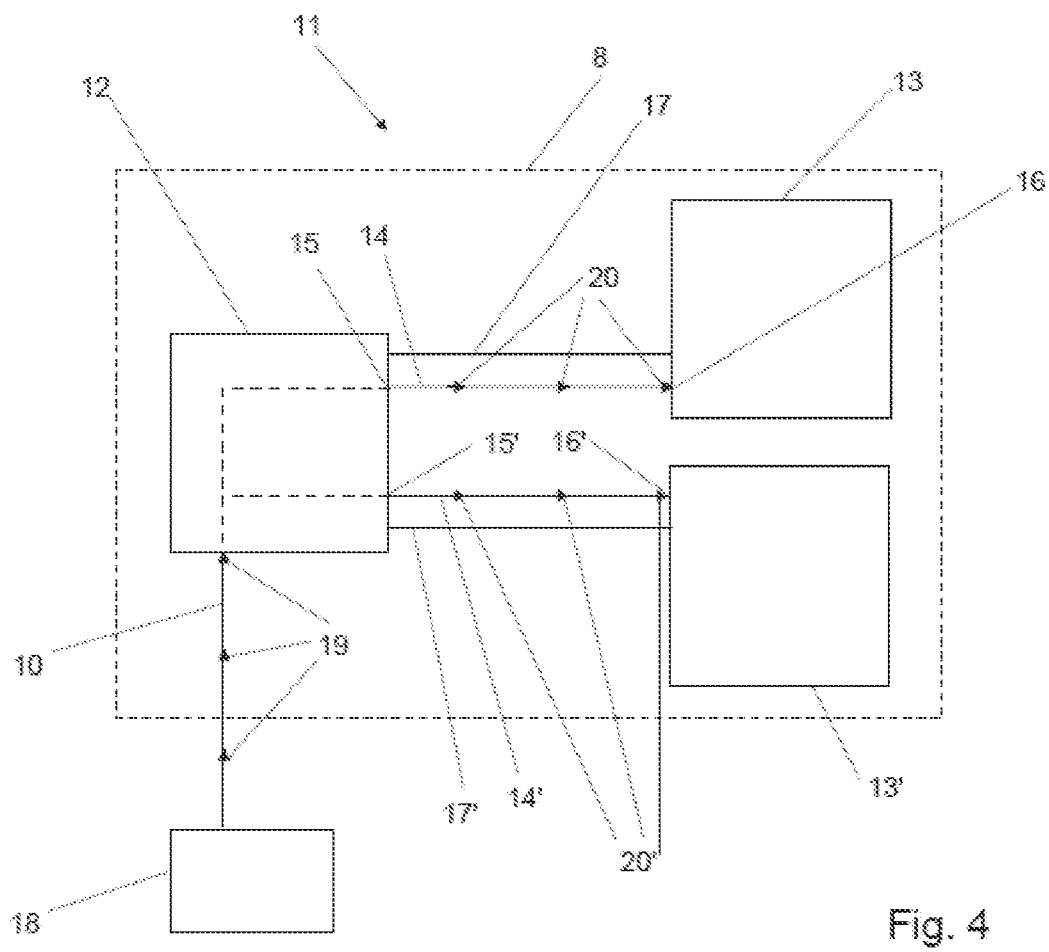
FIG. 4 is a schematic illustration similar to that of FIG. 2, but which shows an electronic control system in accordance with a second embodiment of the present invention.

Turning now to consider FIG. 4, there is illustrated an alternative embodiment of the control system 11 of the present invention. It is to be noted that the embodiment illustrated in FIG. 3 is identical to the embodiment illustrated in FIG. 2 in many respects, and so the same reference numbers are used to denote identical or similar components and signals.

In particular, it will be noted that the embodiment illustrated in FIG. 4 again includes a single master microcontroller 12 which is connected directly to a network bus 10, and a (first) slave microcontroller 13 which is connected to the master microcontroller 12 via a GPIO connection 14. Where the arrangement of FIG. 3 differs from that described above and illustrated in FIG. 2, however, is that the arrangement shown in FIG. 3 includes a second slave microcontroller 13'. The second slave microcontroller 13 may be identical to the first slave microcontroller 13, but could also be different in some respects. Nevertheless, the second slave microcontroller 13' is also configured to run an AUTOSAR-compliant operating system, and is thus configured to operate according to the schedule table processing concept. The second slave microcontroller 13' has a respective synchronization counter (not shown) associated with its schedule table, with the synchronization counter having an identical resolution to the respective synchronization counters of the master microcontroller 12 and the first slave microcontroller 13.

The master microcontroller 12 and the second slave microcontroller 13' are interconnected by a second GPIO connection 14' provided between a second general purpose input/output (GPIO) pin 15' on the master microcontroller 12 and a corresponding GPIO pin 16' on the second slave microcontroller 13'. The second GPIO connection 14' is identical to the first GPIO connection 14 which is provided between the master microcontroller 12 and the first slave microcontroller 13. Like the first slave microcontroller, the second slave microcontroller 13' is connected only to the master microcontroller 12 and is not connected to the network bus 10 directly. Nevertheless, it is envisaged that the master microcontroller 12 and the second slave microcontroller 13' may also be interconnected via a second inter-processor communication path 17', in addition to the GPIO connection 14', to permit the exchange of data pertaining to operation of the various driver assistance and safety systems. In the same manner as the first GPIO connection 14 provided between the master microcontroller 12 and the first slave microcontroller 13, the second GPIO connection 14' is provided solely for the purpose of permitting synchronization of the second slave microcontroller 13' to the network bus 10.

synchronization of the master microcontroller 12 and the first slave microcontroller 13 to the network bus 10 in the embodiment of FIG. 3 occurs in exactly the same manner as described above in connection with the embodiment of f FIG. 2, upon receipt by the master microcontroller 12 of a primary synchronization signal 19 from the network bus 10. Additionally, synchronization of the second slave microcontroller 13' to the network bus 10 also occurs in a similar manner, as will be described in more detail below.

As well as updating its own synchronization counter in response to receipt of the primary synchronization signal 19 from the network bus 10, and issuing a (first) corresponding secondary synchronization signal 20 to the first slave microcontroller 13 via the first GPIO connection 14, the master microcontroller 12 is also configured to issue a corresponding second secondary synchronization signal (denoted schematically by arrows 20' in FIG. 3) to the second slave microcontroller 13' via the second GPIO connection 14'. The second secondary synchronization signal 20' is identical to the first secondary synchronization signal 20 issued to the first slave microcontroller 13, as is issued in synchronism therewith. The second slave microcontroller 13' is similarly configured to update its synchronization counter in response to receipt of the second secondary synchronization signal 20' from the master microcontroller 12, such that the schedule tables of all three microcontrollers 12, 13, 13' will be synchronized to the network bus 10.

It is to be appreciated that whilst the embodiment illustrated in FIG. 2 has a single master microcontroller 12 which controls synchronization of a single slave microcontroller 13 to the network bus 10, and the embodiment illustrated in FIG. 4 has a single master microcontroller 12 which controls the synchronization of two slave microcontrollers 13, 13' to the network bus 10, other embodiments are envisaged in which a single master microcontroller 12 may control synchronization of a greater number of slave microcontrollers to the network bus 10. In such an arrangement it is envisaged that each slave microcontroller will be connected to the master microcontroller 12 via respective GPIO connections, and the master microcontroller 12 will be configured to issue respective secondary synchronization signals to each slave microcontroller.

In all of the embodiments described above, it will be noted that the primary synchronization signal 19 on the network bus 10 will serve to increment the synchronization counter of the master microcontroller 12 and synchronise the schedule table of the (or each) slave microcontroller 13 (13, 13') to the schedule of the network bus 10. The schedule tables of the master microcontroller 12 and the (or each) slave microcontroller 13 (13, 13') are also synchronized relative to one another. Thus, besides the (or each) secondary synchronization signal 20 (20, 20') which will be synchronous to the start of the bus cycle, all inter-processor communication (e.g. via the inter-processor communication paths 17, 17' or on a given peripheral bus) will have a constant delay relative to the (or each) secondary synchronization signal 20 (20, 20'), and will jitter with any jitter on the network bus 10.

The proposals presented herein for the synchronization of multiple microcontrollers 12, 13, 13' based on an external synchronization pulse 19 from a network bus 10 offer significant advantages over prior proposals. In particular, the present invention provides a very simple hardware connection between microcontrollers which has been found to suit various different types/family of microcontrollers, and can easily be extended to be applied to a large number of individual slave microcontrollers 13, 13' under the control of a single master microcontroller 12.

Additionally, the proposal of the present invention provides a synchronization regime which is independent of software applications being run on the microcontrollers 12, 13, 13', by addressing Operating System schedule tables rather than individual tasks. This permits: cross-microcontroller static scheduling, relative offset and expansion of the schedule table across multiple microcontrollers; the development of software applications independently of the hardware layout of an electronic control unit; removal of internal schedule jitter between the synchronized bus and software application tasks by consistent synchronization of the entire task schedule to the network bus; consistent states of synchrony throughout an electronic control unit on all microcontrollers and processing cores therein; and synchronous advance or retardation of the task schedule.

When used in this specification and claims, the terms "includes" and "includes" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

While the above description constitutes the preferred embodiment of the present invention, it will be appreciated that the invention is susceptible to modification, variation and change without departing from the proper scope and fair meaning of the accompanying claims.

The invention claimed is:

1. A vehicle safety electronic control system, comprising:
a master microcontroller and a slave microcontroller; the master microcontroller being connected to a TDMA network bus, and the slave microcontroller being connected to the master microcontroller via a general purpose input/output connection; both of the microcontrollers being configured to operate schedule table based execution, and each of the microcontrollers having a respective synchronization counter, wherein the master microcontroller is configured to update a synchronization counter of the master microcontroller in response to receipt of a primary synchronization signal from the network bus, and to issue a corresponding secondary synchronization signal to the slave microcontroller via the general purpose input/output connection, the slave microcontroller being configured to update a synchronization of the slave microcontroller counter in response to receipt of the secondary synchronization signal from the master microcontroller such that the schedule tables of both of the microcontrollers are synchronized to the network bus, wherein the slave microcontroller comprises a plurality of the slave microcontrollers, wherein each of the plurality of slave microcontrollers is connected to the master microcontroller via the respective general purpose input/output connection, and the master microcontroller is configured to issue a respective the secondary synchronization signal to each of the plurality of microcontrollers via the respective general purpose input/output connection.

2. A control system according to claim 1, further comprising, the master microcontroller is configured to issue the secondary synchronization signal in the form of an Interrupt Service Routine.

3. A control system according to claim 1, further comprising wherein the synchronization counters of the microcontrollers have identical resolutions.

4. A control system according to claim 1, further comprising wherein the slave microcontroller is not connected to the network bus directly.

5. A control system according to claim 1, further comprising wherein the microcontrollers are provided within a single integrated electronic control unit.

6. A control system according to claim 1, further comprising wherein the network bus is a FlexRay bus.

7. A control system according to claim 1, further comprising, wherein the microcontroller is configured to run an AUTOSAR-compliant operating system.

8. A control system according to claim 1, wherein each of the microcontrollers comprises a plurality of processing cores.

9. A control system according to claim 1, incorporated into a motor vehicle electronic safety system.

* * * * *